(12) United States Patent
Imaizumi (10) Patent No.: US 6,712,346 B2
(45) Date of Patent: *Mar. 30, 2004

(54) HELICAL COMPRESSION SPRING FOR A VEHICLE SUSPENSION

(75) Inventor: Toshiyuki Imaizumi, Toyoake (JP)

(73) Assignee: Chuo Hatsujo Kabushiki Kaisha, Nagoya (JP)

( * ) Notice: Subject to any disclaimer, the term of this patent is extended or adjusted under 35 U.S.C. 154(b) by 84 days.

This patent is subject to a terminal disclaimer.

(21) Appl. No.: 10/067,836

(22) Filed: Feb. 8, 2002

(65) Prior Publication Data

US 2002/0105127 A1 Aug. 8, 2002

(30) Foreign Application Priority Data

Feb. 8, 2001 (JP) ........................................ 2001-032865

(51) Int. Cl.⁷ .............................................. B60G 11/14
(52) U.S. Cl. ........................ 267/286; 267/179; 267/180
(58) Field of Search ................................ 267/286, 166, 267/179, 180, 178, 170

(56) References Cited

U.S. PATENT DOCUMENTS

| | | | |
|---|---|---|---|
| 4,903,985 A | 2/1990 | Muhr et al. | |
| 6,199,882 B1 | 3/2001 | Imaizumi et al. | |
| 6,328,290 B1 | 12/2001 | Imaizumi et al. | |
| 6,460,840 B2 * | 10/2002 | Imaizumi et al. | ............ 267/286 |
| 2001/0035601 A1 | 11/2001 | Imaizumi et al. | |

FOREIGN PATENT DOCUMENTS

| | | | | |
|---|---|---|---|---|
| EP | 526689 A1 * | 2/1993 | ............ | C21D/9/02 |
| EP | 0 976 590 A1 | 2/2000 | | |
| EP | 0 976 591 A1 | 2/2000 | | |
| GB | 1198713 | 7/1970 | | |
| JP | 2000-103216 A | 4/2000 | | |
| JP | 2000-104772 A | 4/2000 | | |

OTHER PUBLICATIONS

Satoshi Suzuki et al., "Approaches to Minimizing Side Force of Helical Coil Springs in Suspension Design," *Japan Society for Spring Research*, Aug. 28, 1995, pp. 19–26.

"Trends in Vehicle Dynamics Developments," *Automotive Engineering*, Sep. 1997, pp. 56–57.

Satoshi Suzuki et al., "Approaches to Minimizing Side Force of Helical Coil Springs for Riding Comfort," *SAE Technical Paper Series*, 960730, Society of Automotive Engineers, Inc., 1996, pp. 15–22.

Takashi Gotoh et al., "Optimization of Force Action Line with New Spring Design on the Macpherson Strut Suspension for Riding Comfort," *SAE 2000 Transactions*, Section 6, vol. 109, Society of Automotive Engineers, Inc., 2000, pp. 108–114.

"Close–up," *Nikkei Mechanical*, No. 551, Aug. 2000, pp. 18–24.

* cited by examiner

Primary Examiner—Jack Lavinder
Assistant Examiner—Robert A. Siconolfi
(74) Attorney, Agent, or Firm—Burns, Doane, Swecker & Mathis, LLP (57) ABSTRACT

The present invention is directed to a helical compression spring which is mounted on a vehicle body to be compressed between an upper seat and a lower seat. The spring is formed to provide a coil axis to be substantially curved at a predetermined radius of curvature in an unloaded state of the spring. A pitch of a lower end coil of the spring is set to tilt a lower end plane of the spring at a first angle to the lower seat in a direction for shortening the longitudinal length of the spring at the inside of the curvature in the unloaded state of the spring, and/or a pitch of an upper end coil of the spring is set to tilt an upper end plane of the spring at a second angle in a direction for shortening the longitudinal length of the spring at the outside of the curvature in the unloaded state. And, the pitch of the lower end coil is set to tilt the lower end plane at a third angle to the lower seat on a plane including an end coil center line connecting the centers of the upper end coil and the lower end coil perpendicular to a plane including the end coil center line and the coil axis, in the unloaded state, and/or the pitch of the upper end coil is set to tilt the upper end plane at a fourth angle to the upper seat on that plane, in the unloaded state.

4 Claims, 9 Drawing Sheets

F I G. 11

HELICAL COMPRESSION SPRING FOR A VEHICLE SUSPENSION

This application claims priority under 35 U.S.C. Sec.119 to a patent application No.2001-32865 filed in Japan on Feb. 8, 2001, the entire content of which is herein incorporated by reference.

BACKGROUND OF THE INVENTION

1. Field of the Invention

The present invention relates to a helical compression spring for use in a strut type vehicle suspension, and relates to a strut type vehicle suspension having a helical compression spring.

2. Description of the Related Arts

In general, a vehicle suspension is provided with a helical compression spring, which is generally designed to provide a coil axis that coincides with a direction of reaction force of the spring. Various types of vehicle suspension system have been known heretofore. Among them, a strut type suspension with a shock absorber employed as a strut for positioning a wheel is popular. According to the strut type suspension, however, due to a displacement between its load input axis and strut axis, a bending moment is exerted on the strut, with side force acting on a guide and a piston of the strut. This side force prevents the piston from sliding smoothly in the guide to act as the shock absorber. In order to compensate the bending moment, it has been known to arrange a coil axis of a cylindrical helical compression spring to be offset to the strut axis.

Since the arrangement between the coil axis of the helical compression spring and the strut axis of the shock absorber is determined geometrically, it has been required that the helical compression spring should be designed to coincide its coil axis with the direction of reaction force of the spring. In order to meet such requirement, various studies have been made, including the article "Approaches to Minimizing Side Force of Helical Coil Springs in Suspension Design", presented by engineers including the inventor of the present application, and received by Japan Society for Spring Research on Aug. 28, 1995, wherein it was proposed to minimize the side force of the helical compression spring.

In contrast, on pages 56 and 57 of "Automotive Engineering" issued on September 1997, there are disclosed two kinds of spring having a coil axis inclined to an axis of a shock absorber so as to minimize a friction of the shock absorber for a strut type suspension. One spring is so constituted that one end coil is formed into a pig tail coil, and an axis for connecting the center of the pig tail coil and the center of the other end coil is served as the axis of the shock absorber, and that the axis and a spring force direction (reaction force direction) are arranged to provide a certain angle so that they are intersected at the center of the other end coil. The other spring is so constituted that both end coils are formed into the pig tail coils, and an axis for connecting the centers of those end coils is served as the axis of the shock absorber, and that the axis and the spring force direction are arranged to provide a certain angle so that they are intersected at a longitudinal center of the spring.

With respect to the vehicle suspension, further reduction in size is required now. By means of mere improvement made to a supporting mechanism of the strut having a conventional cylindrical helical compression spring, therefore, it is difficult to compensate the bending moment exerted on the strut due to load from a road. Rather, it is necessary to positively increase a side force applied by the helical compression spring to the strut type suspension, especially widthwise of the vehicle. However, it is not easy to apply a desired side force to the suspension by the conventional helical compression spring. By means of the helical spring disclosed in the aforementioned publication of the Automotive Engineering, sufficient side force necessary for the strut type suspension can not be obtained. Namely, it is impossible to apply the side force to the guide portion and piston portion of the strut enough to compensate the side force exerted thereon.

Therefore, the applicant proposed a helical compression spring for a strut type suspension with a simple structure to apply a desired side force to the strut when mounted on the strut type suspension, in a Japanese patent application No. 11-140649 filed on May 20, 1999, which was published under Japanese Patent Publication No. 2000-104772 on Apr. 11, 2000 in Japan. This Japanese patent application corresponds to the U.S. Pat. No. 6,328,290 B1 issued on Dec. 11, 2001 and its divisional patent application which is now pending. According to the helical compression spring as proposed above, by simply installing the helical compression spring as described hereinafter in the suspension without making a specific change to the prior suspension, the spring is properly mounted on the strut so that a reaction force axis of the spring lies approximately on the center of an upper seat, and that the desired side force is applied to the strut, whereby a smooth absorbing operation can be ensured. In the helical compression spring for the vehicle suspension to be compressed between an upper seat and a lower seat, the spring is formed to provide a coil axis that is substantially curved at a predetermined radius of curvature in an unloaded state of the spring, and a pitch of the lower end coil is set to tilt a lower end plane of the spring seated on the lower seat at a predetermined angle to the lower seat in the direction for shortening the longitudinal length of the spring at the inside of the curvature, in an unloaded state of the spring, and/or a pitch of the upper end coil is set to tilt an upper end plane of the spring seated on the upper seat, at a predetermined angle in the direction for shortening the longitudinal length of the spring at the outside of the curvature, in the unloaded state of the spring.

According to the helical compression spring as constituted above, if a position of coiling end of a lower end coil can not be changed, for example, it will be necessary to limit the total number of coils (turns) to 4.55 coils, for example, so as to direct the side force in a predetermined direction. This limitation of the number of coils requires a change of the total number of coils by a unit of one coil. As a result, change in diameter of a coil wire will be necessitated, so that it will be difficult to reduce a total weight of the spring, as explained with referenced to FIGS. 9, 10 and 11, hereinafter.

Figure 9:
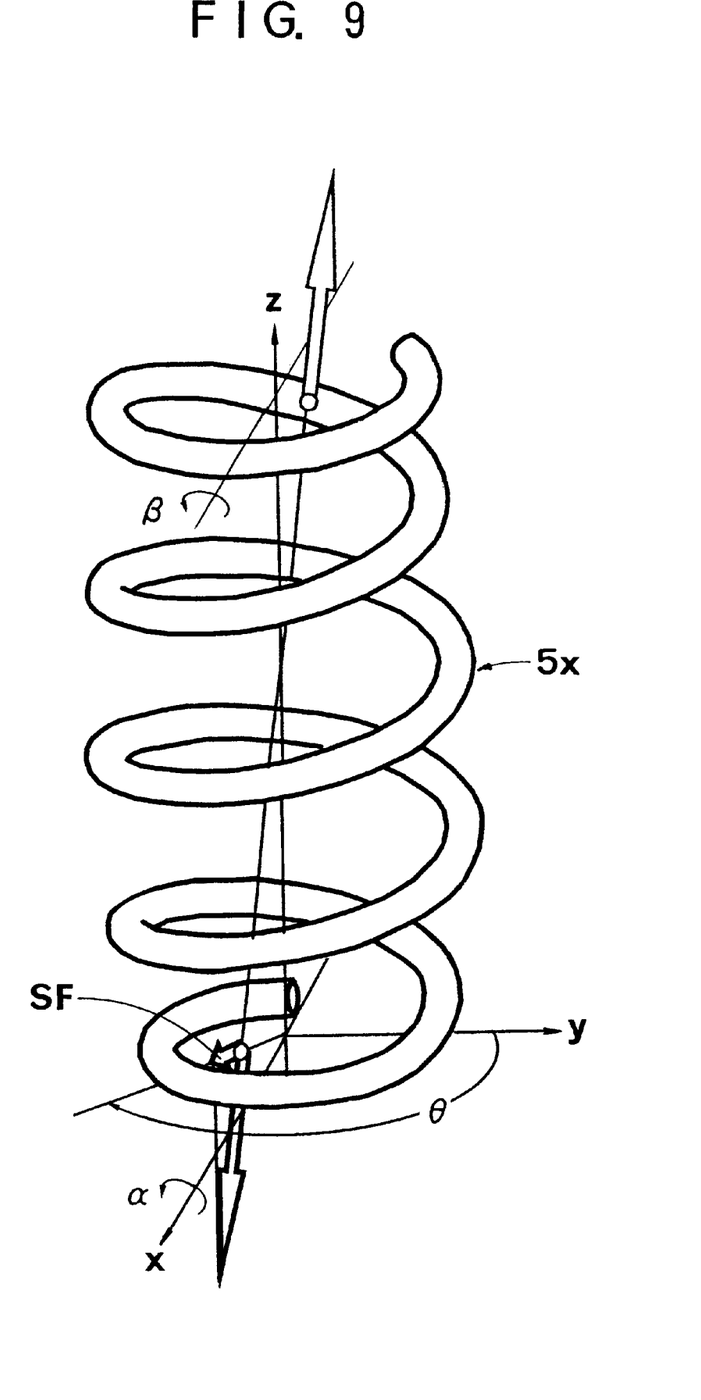
FIG. 9 is a perspective view showing a helical compression spring for experimenting the spring to investigate influence on a spring reaction force by tilting a lower end plane and an upper end plane of the spring.
Figure 10:
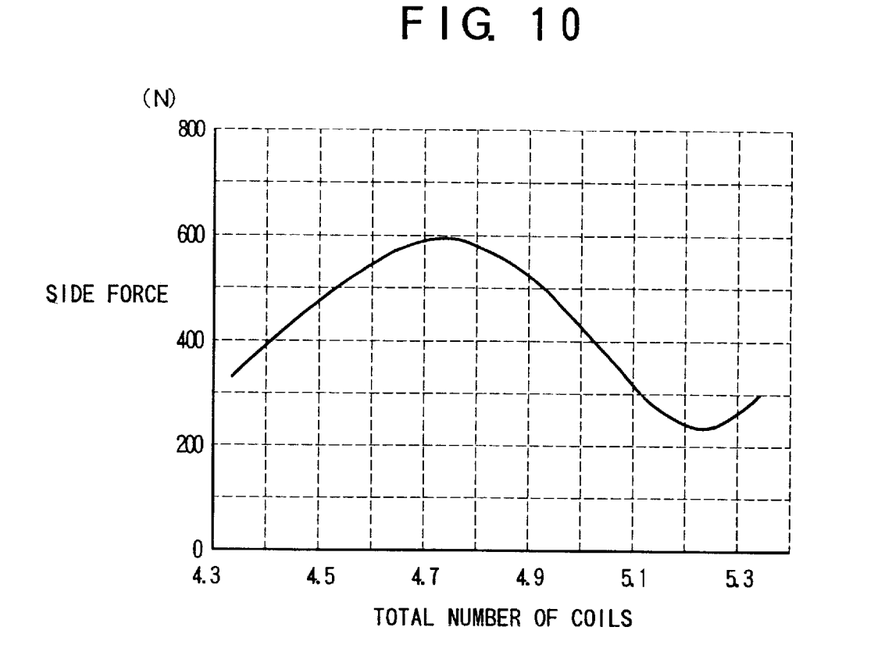
FIG. 10 is a diagram showing a relationship between a total number of coils and a side force when the helical compression spring as shown in FIG. 9 is compressed to a predetermined height.
Figure 11:
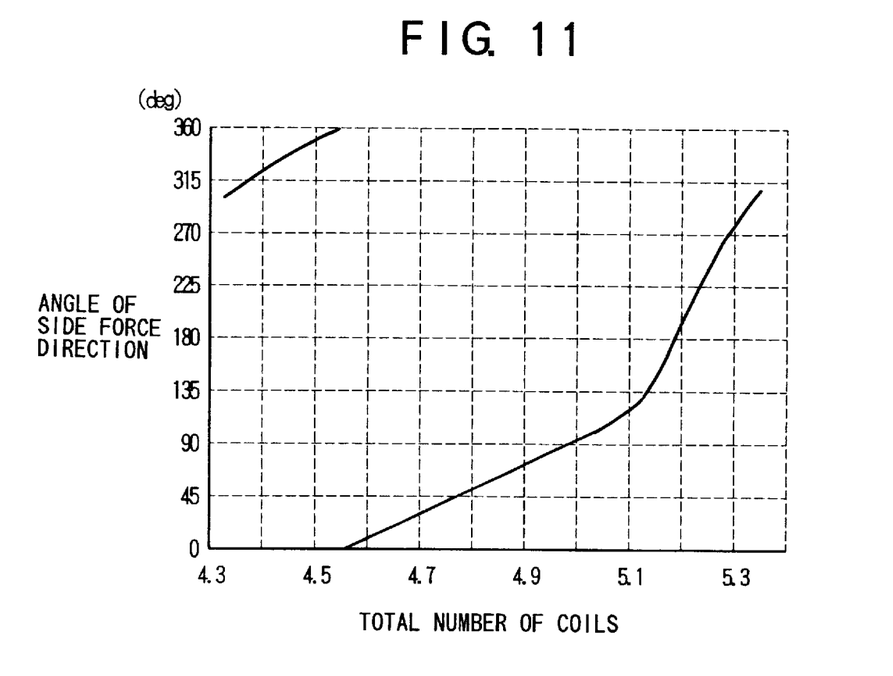
FIG. 11 is a diagram showing a relationship between a total number of coils and an angle of a side force direction, when the helical compression spring as shown in FIG. 9 is compressed to a predetermined height.

FIG. 9 shows a model helical compression spring 5x having an end coil center line for connecting the centers of the lower end coil and upper end coil, which coincides with a coil axis of a body portion of the spring, on the z-axis as shown in FIG. 9. In general, the reaction force, which is caused when the helical compression spring is compressed, does not coincide with the coil axis. As shown in FIG. 9, its component projected on the x-y plane is called as a side force (SF), and an angle ($\theta$) rotated clockwise from the y-axis indicative of its direction is called as a side force direction. The value and direction of the side force are varied periodically in response to the total number of coils of the helical compression spring, as shown in FIG. 10 and FIG. 11, respectively.

Accordingly, when the helical compression spring as proposed in the above-described Japanese patent application No.11-140649 is installed in the vehicle, it is desirable to adjust the side force not only widthwise of the vehicle, but also lengthwise of the vehicle. In this case, however, different countermeasures will have to be made, in the case where it is possible to change a position of a coiling end of a lower end coil (or upper end coil), or it is possible to change a design of the lower end coil (or upper end coil), and the case where it is impossible to change the position of the coiling end of the lower end coil (or upper end coil), or it is impossible to change the design of the lower end coil (or upper end coil), as explained hereinafter.

In the case where it is possible to change the position of the coiling end of the lower end coil (or upper end coil), the position of the coiling end may be changed to direct the side force in the desired direction. On the contrary, in the case where it is impossible to change the position of the coiling end, the limitation of the number of coils may be made to direct the side force in the desired direction. For example, supposing that the positive direction on the y-axis corresponds to the outside of the vehicle, in order to direct the side force to the outside of the vehicle, the total number of coils may be set to approximately 4.55 coils, whereby the angle $\theta$ is zero, as shown in FIG. 11. In the latter case, however, when the spring constant is to be changed, it is necessary to change the total number of coils and the diameter of coil wire by a unit of one coil. Therefore, it will be difficult to meet the requirement for reduction in size. Namely, because the direction of the side force is varied periodically by a unit of one coil, the total number of coils of 3.55 coils or 5.55 coils, for example, other than 4.55 coils, has to be selected.

According to a general procedure of designing a spring, after the diameter of the coil wire was determined so as to provide design stress of an allowable value, the number of coils is determined so as to provide the spring constant of a predetermined value. In this case, however, if the total number of coils is limited, the spring having the total number of coils more than the one designed according to the general procedure as described above will have to be selected. This is because, in the case where the total number of coils designed according to the general procedure was 4.7 coils, for example, if the total number of coils less than 3.55 coils is selected, the diameter of coil wire has to be made small enough to keep the spring constant, whereby the design stress will exceed the allowable value. In this case, therefore, 5.55 coils has to be selected for the number of coils, and the diameter of coil wire has to be made large enough to keep the spring constant. As a result, the weight will be increased, and the requirement for reduction in weight can not be fulfilled.

SUMMARY OF THE INVENTION

Accordingly, it is an object of the present invention to provide a helical compression spring with a side force adjusted easily and appropriately, not only widthwise of a vehicle but also lengthwise of the vehicle, when the spring is mounted on a strut type suspension for the vehicle.

Another object of the present invention is to provide a strut type vehicle suspension for adjusting easily and appropriately a side force applied by a helical compression spring to a strut, not only widthwise of a vehicle but also lengthwise of the vehicle.

In accomplishing the above and other objects of the present application, a helical compression spring for a vehicle suspension according to the present invention is compressed between an upper seat and a lower seat. The spring is formed to provide a coil axis to be substantially curved at a predetermined radius of curvature in an unloaded state of the spring. A pitch of a lower end coil of the spring is set to tilt a lower end plane of the spring seated on the lower seat at a first predetermined angle to the lower seat in a direction for shortening the longitudinal length of the spring at the inside of the curvature in the unloaded state of the spring, and/or a pitch of an upper end coil of the spring is set to tilt an upper end plane of the spring seated on the upper seat at a second predetermined angle in a direction for shortening the longitudinal length of the spring at the outside of the curvature in the unloaded state of the spring. And, the pitch of the lower end coil is set to tilt the lower end plane of the spring at a third predetermined angle to the lower seat on a plane including an end coil center line connecting the centers of the upper end coil and the lower end coil perpendicular to a plane including the end coil center line and the curved coil axis, in the unloaded state of the spring, and/or the pitch of the upper end coil is set to tilt the upper end plane of the spring at a fourth predetermined angle to the upper seat on the plane including the end coil center line perpendicular to the plane including the end coil center line and the curved coil axis, in the unloaded state of the spring.

The spring may be formed to provide a coil axis on the plane including the end coil center line perpendicular to the plane including the end coil center line and the curved coil axis, to be curved in a predetermined direction in the unloaded state of the spring.

A strut type vehicle suspension includes a strut mounted at the upper end thereof on a vehicle body for supporting a wheel, a lower seat fixed to the strut, an upper seat mounted on the vehicle body, and a helical compression spring mounted between the lower seat and the upper seat, with the strut enclosed in the spring. The helical spring is preferably formed to provide a coil axis to be substantially curved at a predetermined radius of curvature in an unloaded state of the spring. The lower seat is fixed to the strut to tilt the lower seat at a first predetermined angle in a direction for shortening the longitudinal length of the spring at the outside of the curvature in the unloaded state of the spring, and/or the upper seat is mounted on the vehicle body to tilt the upper seat at a second predetermined angle in a direction for shortening the longitudinal length of the spring at the inside of the curvature in the unloaded state of the spring. The lower seat is fixed to the strut to tilt the lower seat at a third predetermined angle on a plane including an end coil center line connecting the centers of an upper end coil and a lower end coil of the spring perpendicular to a plane including the end coil center line and the curved coil axis, and/or the upper seat is mounted on the vehicle body to tilt the upper seat at a fourth predetermined angle on the plane including the end coil center line perpendicular to the plane including the end coil center line and the curved coil axis. And, the spring is held in such a state that the inside of the curved coil axis is positioned at the inside of the vehicle body.

In the strut type vehicle suspension as described above, the helical spring may be formed to provide a coil axis on the plane including the end coil center line perpendicular to the plane including the end coil center line and the curved coil axis, to be curved in a predetermined direction in the unloaded state of the spring.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
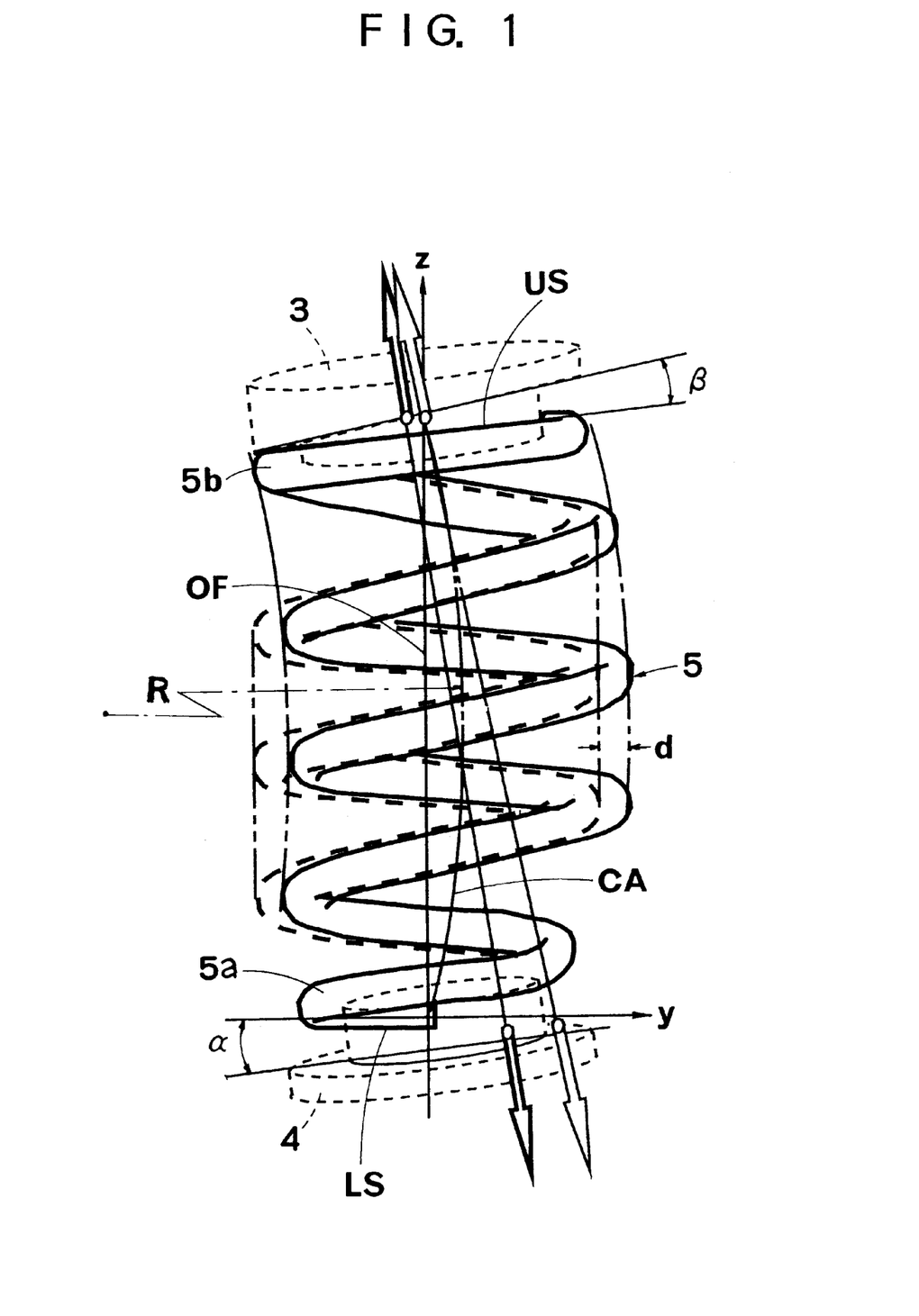
FIG. 1 is a side view of a helical compression spring projected on the y-z plane, for use in a vehicle suspension according to an embodiment of the present invention.
Figure 2:
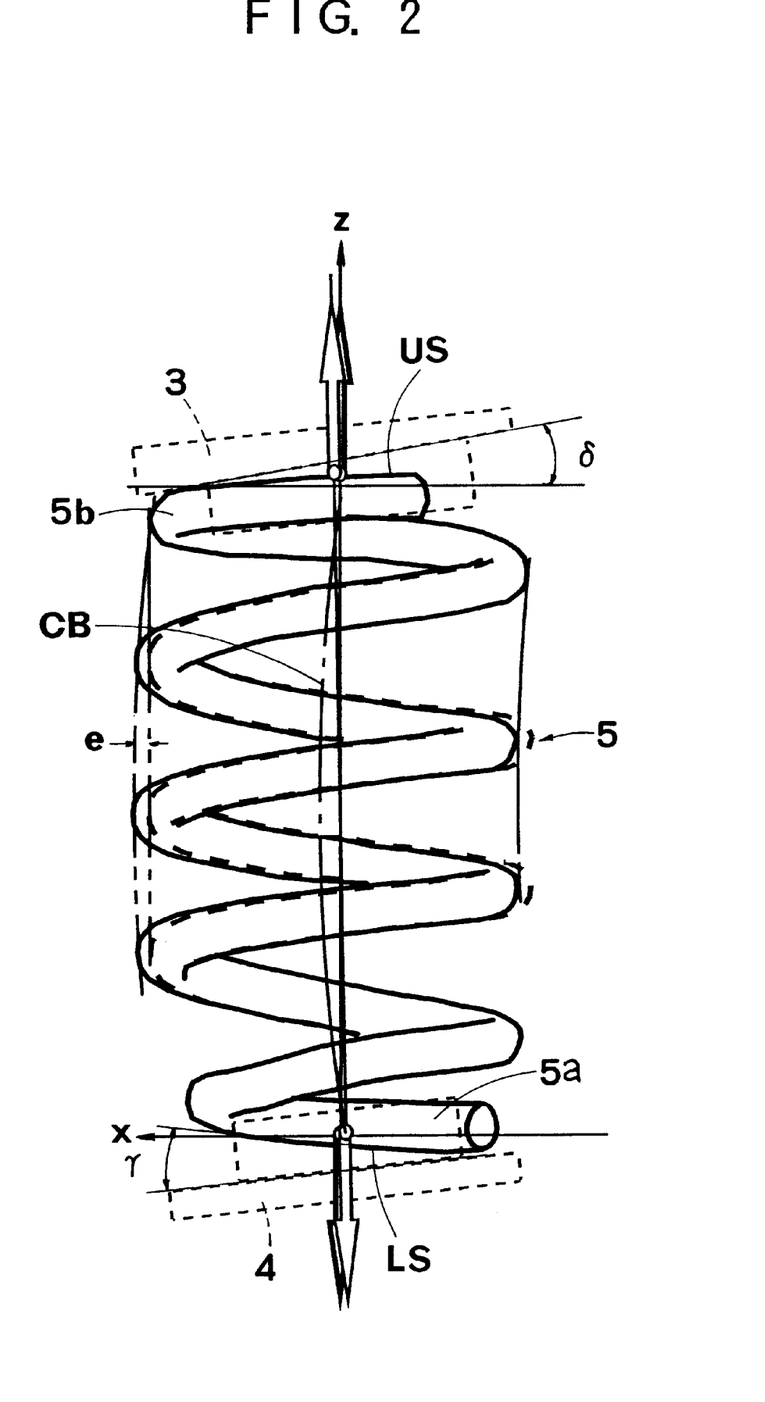
FIG. 2 is a side view of a helical compression spring projected on the x-z plane, for use in a vehicle suspension according to an embodiment of the present invention.

Referring to FIGS. 1 and 2, there is schematically illustrated a helical compression spring 5 (hereinafter, simply referred to as a helical spring 5) for use in a vehicle suspension. The helical spring 5 is arranged in the same manner as a helical compression spring 5x on three dimensional coordinates of x, y, z axes as shown in FIG. 9. FIG. 1 shows a side view of the helical spring 5 projected on the y-z plane, and FIG. 2 shows its side view projected on the x-z plane. The helical spring 5 is mounted on a strut type suspension (hereinafter, simply referred to as suspension), as shown in FIG. 8 which illustrates the suspension by two-dot chain lines except for a portion for supporting the upper end of the helical spring 5.

At the outset, the overall structure of the suspension will be explained with reference to FIG. 8. A strut 2 is elastically mounted at its upper end on a vehicle body 1, and an upper seat 3 is mounted on the vehicle body 1. A lower seat 4 is fixed to a middle portion of the strut 2. Between the upper seat 3 and the lower seat 4, the helical spring 5 is arranged to encircle therein the strut 2. The lower end of the strut 2 is fixed to a knuckle 6, which is pivotally mounted on the vehicle body 1 through a lower arm 7. Accordingly, a wheel 8 is mounted on the knuckle 6, which is connected to the vehicle body 1 through the strut 2 and the helical spring 5, and which is connected to the vehicle body 1 through the lower arm 7. The strut 2 is provided with a cylinder 2a and a rod 2b which is slidably mounted in the cylinder 2a, to form a shock absorber. The rod 2b is mounted at its upper end on the vehicle body 1 through the strut mount 10, and the cylinder 2a is fixed at its lower end to the knuckle 6. The strut mount 10 includes a lower bracket 12 for mounting the upper seat 3 on the vehicle body 1 through a bearing 11, an upper bracket 13 connected by bolts (not shown) to the vehicle body 1 together with the lower bracket 12, and a damper rubber 14 disposed between them. A supporting bracket 15 is fixed to the tip end of the rod 2b, and supported by the damper rubber 14 between the lower bracket 12 and the upper bracket 13. According to the present embodiment, therefore, the strut mount 10 is of a type with load transmitted separately, wherein the strut 2 is mounted on the vehicle body 1 through the damper rubber 14, whereas the helical spring 5 is mounted on the vehicle body 1 through the bearing 11. As a result, any stress which is caused when the helical spring 5 is compressed and expanded, can be absorbed properly. The damper rubber 14 is arranged so that the reaction force axis of the helical spring 5 extends through approximately the center of the upper end plane US.

Figure 8:
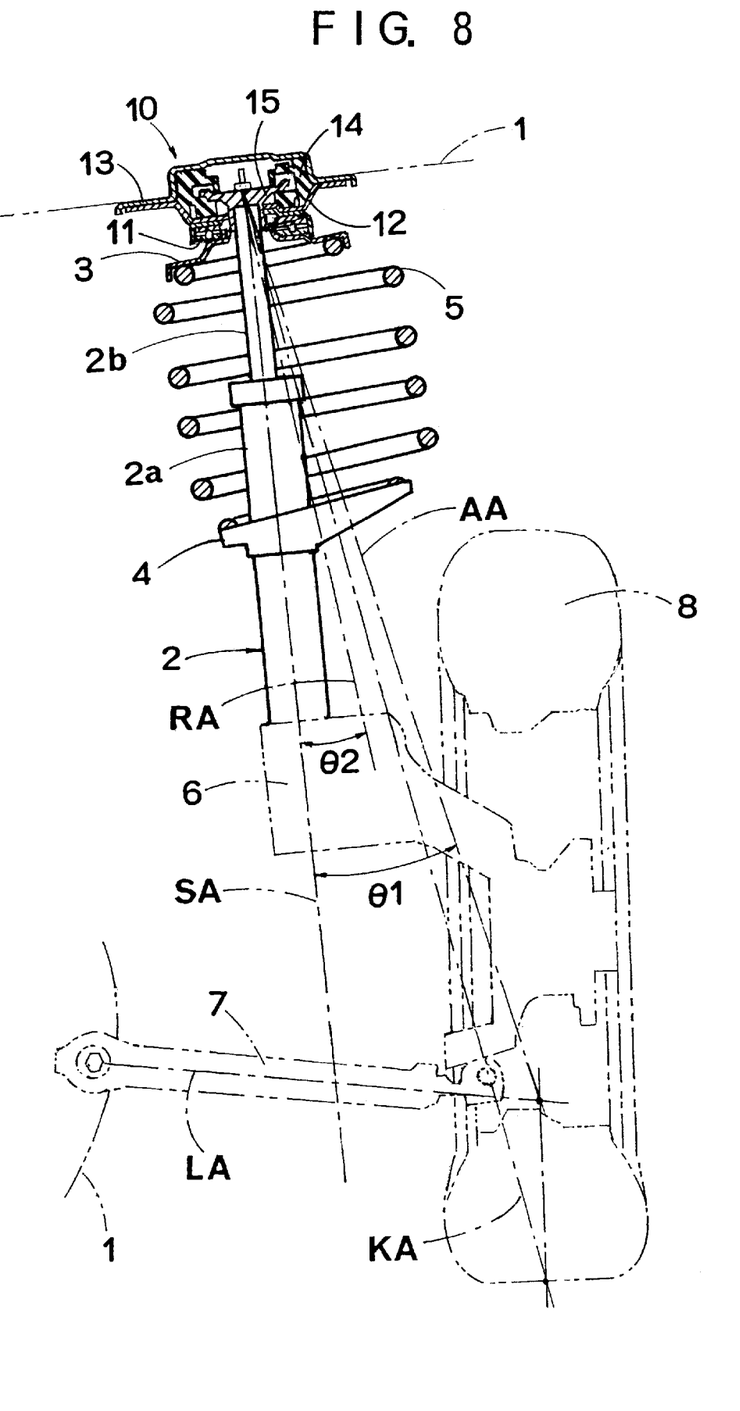
FIG. 8 is a side view of a vehicle suspension with a helical compression spring installed thereon according to an embodiment of the present invention.

According to the suspension as shown in FIG. 8, the reaction force axis RA does not coincide with the load input axis AA. That is, the strut axis SA of the strut 2 and the load input axis AA form an angle θ1, whereas the strut axis SA and the reaction force axis RA form an angle θ2. In FIG. 8, "LA" designates the axis of the lower arm 7, "KA" designates the axis of a king pin (not shown). Due to the relationship between the reaction force axis RA and the strut axis SA which do not coincide with each other, sliding resistance may be caused between the cylinder 2a and the rod 2b of the strut 2. However, the sliding resistance will be compensated by the biasing force of the helical spring 5 to ensure a smooth sliding motion of the rod 2b, as will be described later.

According to the present embodiment, the helical spring 5 is formed with a lower end coil 5a and an upper end coil 5b, both of which are formed to provide a pig tail, as shown in FIGS. 1 and 2. Referring to FIG. 1, the helical spring 5 is formed to provide a coil axis CA of a body portion of the helical spring 5 curved at a predetermined radius of curvature "R" on the y-z plane, with the y-axis extending in a predetermined direction (widthwise of the vehicle), and the z-axis extending along an end coil center line OF for connecting the centers of the lower end coil 5a and the upper end coil 5b, i.e., the centers of the lower end plane LS and the upper end plane US, to provide an initially curved amount "d" of the body portion of the spring. The coil axis CA may be formed by a plurality of radius of curvatures which are curved in the same direction substantially at the predetermined radius of curvature. Or, the coil axis CA may be formed by a plurality of rectilinear lines which are connected to be curved substantially at the predetermined radius of curvature.

And, a pitch of the lower end coil 5a is set to tilt the lower end plane LS of the helical spring 5 at a first predetermined angle α to the lower seat 4 in a direction (clockwise in FIG. 1) for shortening the longitudinal length of the inside of the curvature of the helical spring 5 (left side in FIG. 1) in an unloaded state of the helical spring 5. Also, a pitch of the upper end coil 5b is set to tilt the upper end plane US of the helical spring 5, at a second predetermined angle β to the upper seat 3 in a direction (clockwise in FIG. 1) for shortening the longitudinal length of the outside of the curvature of the helical spring 5 (right side in FIG. 1) in the unloaded state of the helical spring 5.

In this case, the relationship between the lower end plane LS and the lower seat 4 is relative to each other. According to the embodiment as shown in FIG. 1, the lower end plane LS is placed on the horizontal plane, whereas the lower seat 4 is tilted by the predetermined angle α. On the contrary, the lower seat 4 may be placed on the horizontal plane, whereas the lower end plane LS may be tilted by the predetermined angle α. Likewise, the relationship between the upper end plane US and the upper seat 3 is relative to each other. According to the embodiment as shown in FIG. 1, the upper seat 3 may be tilted, and the upper plane US may be tilted by the predetermined angle β to the tilted upper seat 3. Alternately, the upper plane US may be tilted, and the upper seat 3 may be tilted by the predetermined angle β to the tilted upper plane US. According to the present embodiment, it is so arranged that no adjustment is required with respect to the suspension. Therefore, the upper seat 3 and lower seat 4 are arranged to hold their supporting planes in parallel with each other.

According to the present embodiment as described above, in the unloaded state of the helical spring 5, the pitch of the lower end coil 5a is set to tilt the lower end plane LS at the first predetermined angle α to the lower seat 4, clockwise in FIG. 1, and the pitch of the upper end coil 5b is set to tilt the upper end plane US at the second predetermined angle β to the upper seat 3, clockwise in FIG. 1. However, only either one of the pitch of the lower end coil 5a and that of the upper end coil 5b may be set. That is, in addition to the above-described embodiment, a second embodiment (not shown) may be formed, such that the helical spring 5 is formed to provide the curved coil axis CA, and only the pitch of the lower end coil 5a is set to tilt the lower end plane LS at a predetermined angle to the lower seat 4 in the unloaded state of the helical spring 5. And, a third embodiment (not shown) may be formed, such that the helical spring 5 is formed to provide the curved coil axis CA, and only the pitch of the upper end coil 5b is set to tilt the upper end plane US at a predetermined angle to the upper seat 3, in the unloaded state of the helical spring 5.

Next will be explained results of the experiments in the case where the helical spring with the coil axis thereof curved to extend in the direction along the y-axis is compressed to shorten the longitudinal length of either one side of the helical spring, i.e., the helical spring with the coil axis thereof curved on the y-z plane is placed on the same position as the helical spring 5x as shown in FIG. 9, and the upper end plane and lower end plane are rotated counterclockwise about the x-axis as viewed from the positive side of the x-axis toward the origin, by α degree and β degree, respectively.

Figure 3:
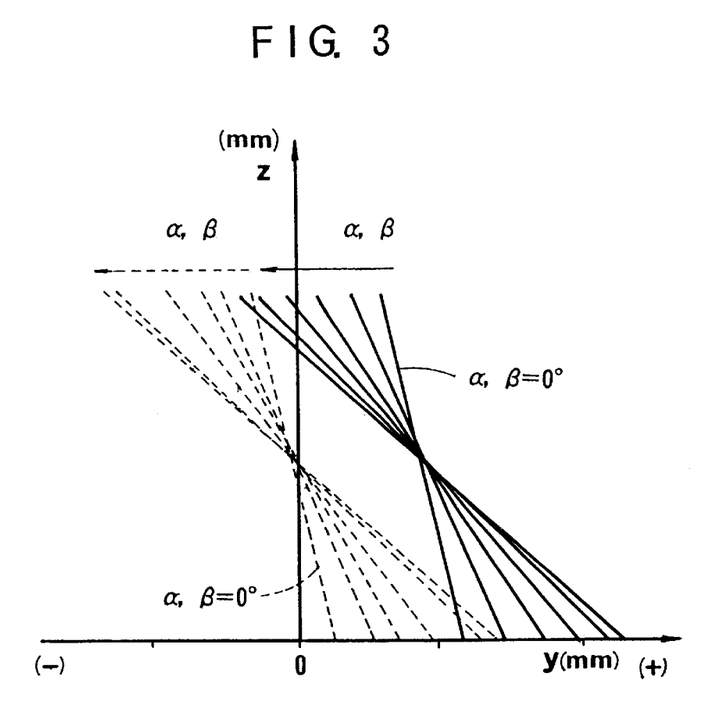
FIG. 3 is a diagram showing a variation of a reaction force axis of a helical compression spring, in the case where an upper end plane and a lower end plane are rotated counterclockwise about the x-axis as viewed from the positive side of the x-axis toward the origin, when the spring with the coil axis thereof curved on the y-z plane is compressed to a predetermined height.

In FIG. 3, solid lines indicate variation of the reaction force axis of the helical spring, in the case where the upper end plane and the lower end plane are rotated counterclockwise about the x-axis as viewed from the positive side of the x-axis toward the origin, by α degree and β degree, respectively, when the helical spring with the coil axis thereof curved on the y-z plane is compressed to a predetermined height. Broken lines indicate variation of the reaction force axis of a conventional helical spring. When rotational angles which are rotated about the x-axis in FIG. 9, i.e., tilting angles α and β, are increased counterclockwise, the reaction force axis will move as indicated by the arrows, which indicate the directions of increasing angles α and β. The reaction force axis lies on the line for connecting the points of application of the reaction forces acting on the upper end plane and lower end plane.

As shown in FIG. 3, the following results are obtained from the experiment. Namely, (1) By forming the helical spring with the coil axis thereof curved by the initially curved amount "d", the reaction force axis of the spring is displaced parallel in the y-direction, i.e., in the curved direction of the body portion of the helical spring. (2) With an increase of the tilting angles α and β of the upper and lower end planes counterclockwise in FIG. 9, the inclination of the reaction force axis of the spring increases in the y-direction increases. In other words, the side force applied to the helical spring increases, with an increase of the tilting angles α and β. (3) With an increase of the tilting angles α and β of the upper and lower end planes, the point of application of the reaction force on the upper end plane gets close to the center of the upper end plane, i.e., z-axis in FIG. 3, as indicated by the solid lines, whereas the conventional helical spring gets away from the center of the upper end plane as indicated by the broken lines.

On the contrary, in the case where the upper end plane and the lower end plane are rotated clockwise about the x-axis as viewed from the positive side of the x-axis toward the origin, when the spring with the coil axis thereof curved on the y-z plane is compressed to a predetermined height, the inclination of the reaction force axis in the y-direction will be reduced, i.e., the side force to the helical spring will be reduced, with the tilting angles α and β increased clockwise.

Figure 4:
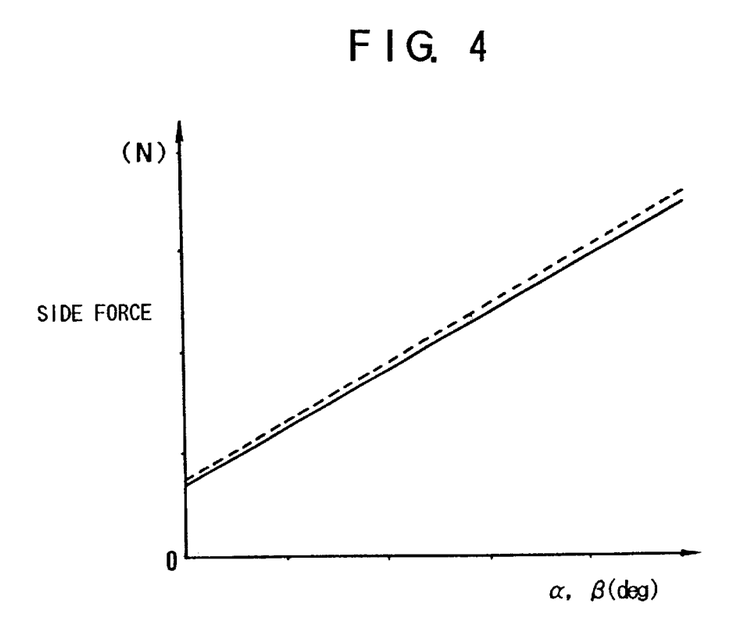
FIG. 4 is a diagram showing a variation of a side force in response to a rotating angle, in the case where an upper end plane and a lower end plane are rotated counterclockwise about the x-axis as viewed from the positive side of the x-axis toward the origin, when the spring with the coil axis thereof curved on the y-z plane is compressed to a predetermined height.

FIG. 4 indicates a variation of the side force, in the case where the upper end plane and the lower end plane are rotated counterclockwise about the x-axis in FIG. 9 as viewed from the positive side of the x-axis toward the origin, by α degree and β degree, when the spring with the coil axis thereof curved on the y-z plane is compressed to a predetermined height, and in the case where the degree α or β is increased. In FIG. 4, a solid line indicates the variation of the curved helical spring, and a broken line indicates the variation of the conventional helical spring. As clearly shown in FIG. 4, the side force is increased with an increase of the tilting angle α or β, and no significant difference can be seen between the solid line and the broken line.

Therefore, as for the helical spring 5 according to the present embodiment, the radius of curvature "R" (or, the curved amount "d") as shown in FIG. 1 and tilting angles α and β (clockwise rotational angles as shown in FIG. 1) are set, and the pitches of the upper end coil 5b and the lower end coil 5a are set, such that the helical spring 5 is disposed between the upper seat 3 and the lower seat 4 as shown in FIG. 8, in the same condition that the upper end coil and lower end coil of the helical spring 5x as shown in FIG. 9 are rotated counterclockwise about the x-axis as viewed from the positive side of the x-axis toward the origin in FIG. 9, by α degree and β degree, respectively, when the helical spring 5x is compressed to a predetermined height. Consequently, when the helical spring 5 as shown in FIG. 1 is disposed between the upper seat 3 and the lower seat 4 arranged substantially in parallel with each other, it is arranged in the state as shown in FIG. 8, and the same effect can be obtained as the one obtained when the upper end coil and the lower end coil of the helical spring 5x as shown in FIG. 9 are tilted counterclockwise as viewed from the positive side of the x-axis toward the origin in FIG. 9.

The helical spring 5 as constituted above is disposed between the upper seat 3 and the lower seat 4, which are arranged substantially in parallel with each other as shown by the broken lines in FIG. 1. In this case, the helical spring 5 is held such that the inside of the curvature of the coil axis CA (left side in FIG. 1) is to be positioned at the inside of the vehicle (not shown in FIG. 1). Consequently, the reaction force axis is shifted from the axis indicated by thick line arrows to the axis indicated by thin line arrows (rightward in FIG. 1).

As shown in FIG. 1 which illustrates the helical spring 5 as viewed from the front of the vehicle, the helical spring 5 is disposed with its coil axis CA curved widthwise of the vehicle, i.e., in the width direction of the vehicle. In this case, the side force is exerted on the helical spring 5 lengthwise of the vehicle, i.e., in the direction as viewed from the right side or left side of the vehicle. In view of this fact, the present embodiment is constituted as shown in FIG. 2, and will be described later.

Figure 5:
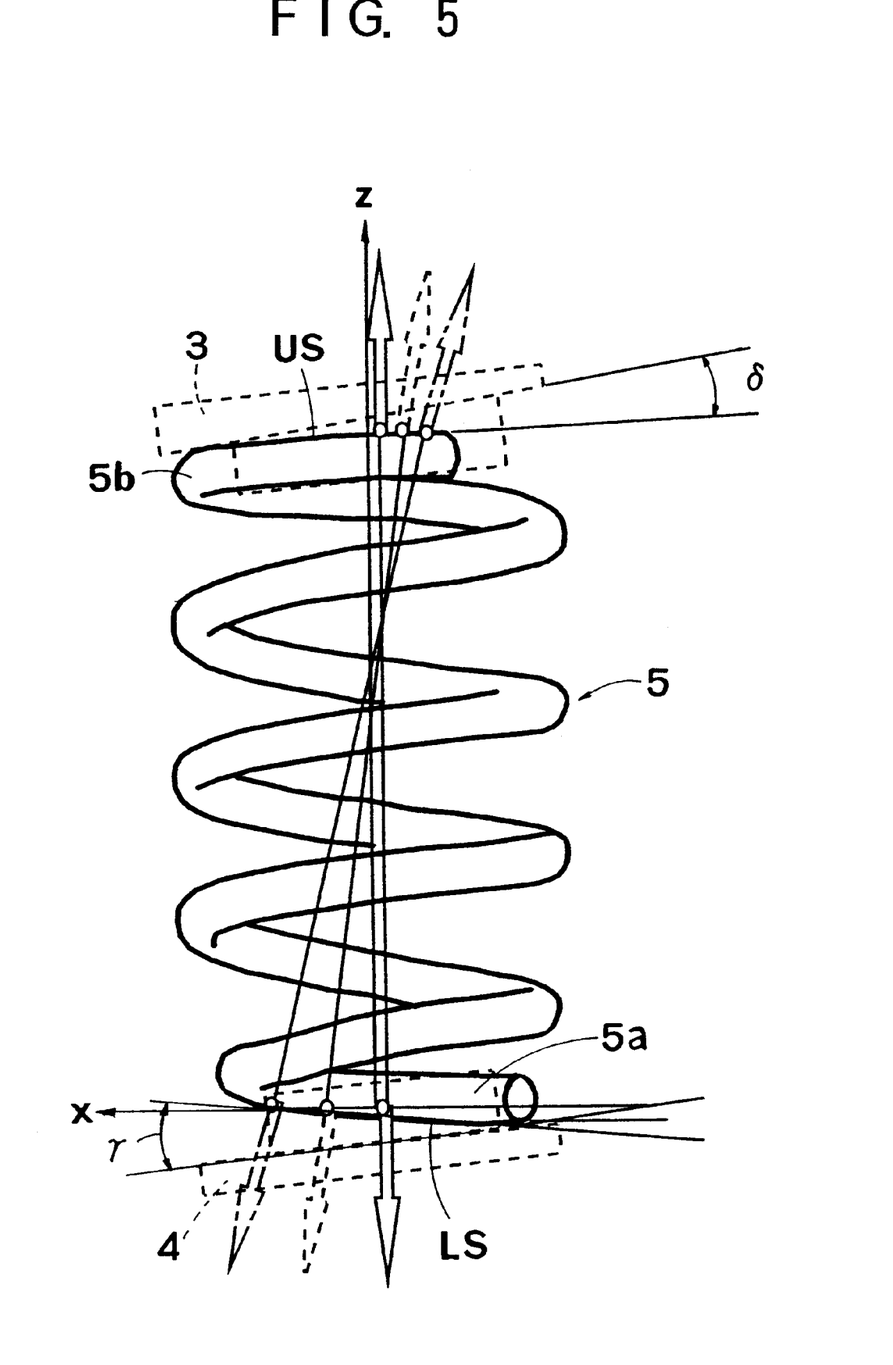
FIG. 5 is a side view of a helical compression spring with the coil axis thereof curved on the y-z plane and projected on the x-z plane, showing a variation of a reaction force axis when predetermined angles δ and γ are varied, in the case where a pitch of a lower end coil is set so that a lower end plane is tilted to a lower seat by the predetermined angle γ, and a pitch of an upper end coil is set so that an upper end plane is tilted to an upper seat by the predetermined angle δ.
Figure 6:
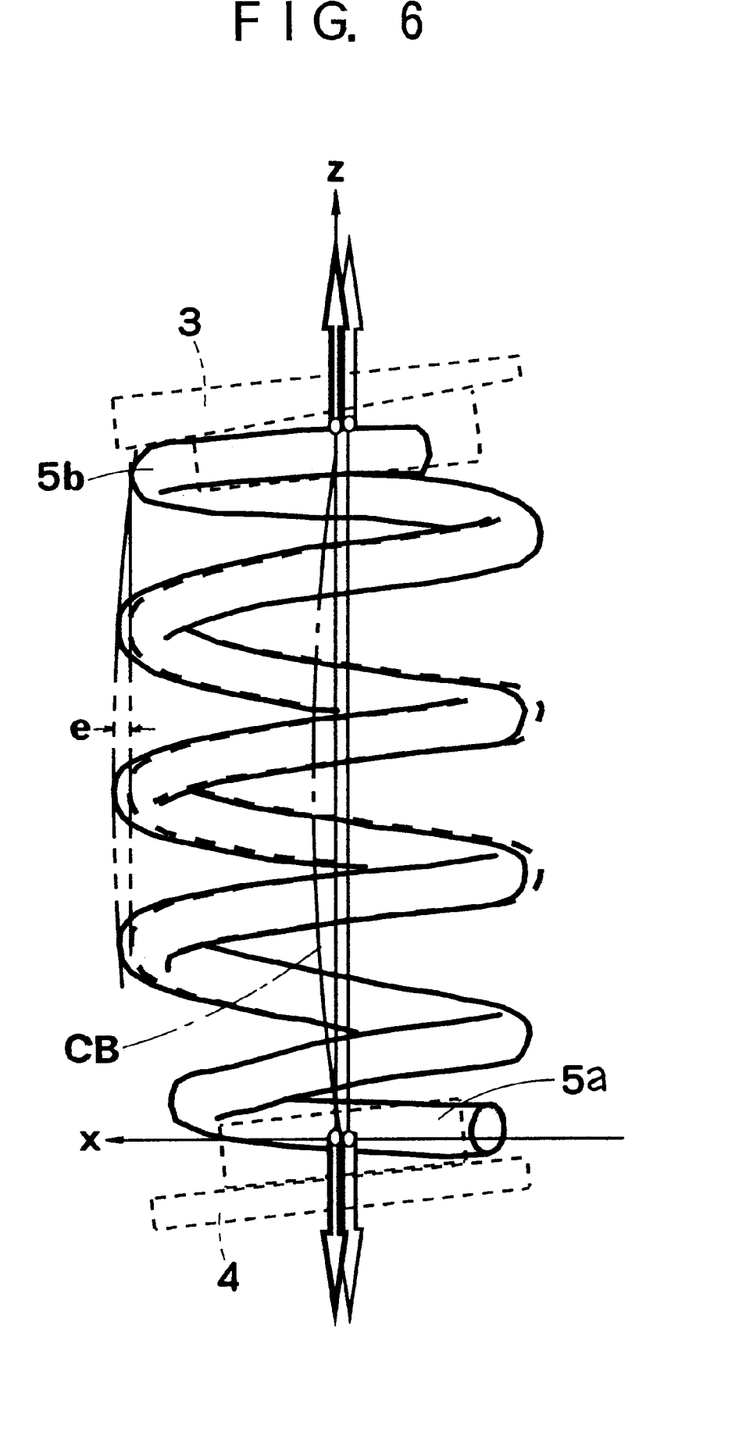
FIG. 6 is a side view showing a variation of a reaction force axis of a helical compression spring with the coil axis thereof curved on the y-z plane, with a coil axis of the spring curved on the x-z plane.
Figure 7:
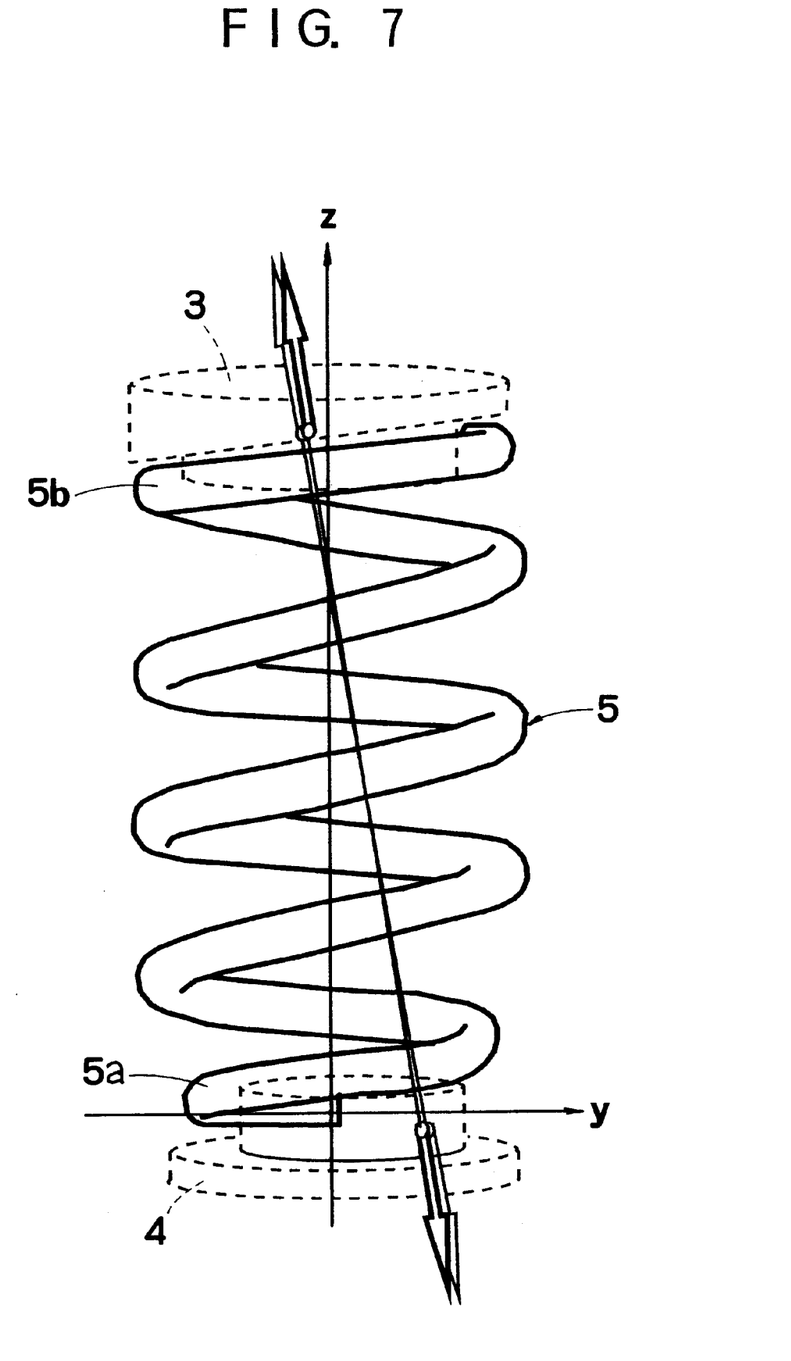
FIG. 7 is a side view showing a variation of a reaction force axis of a helical compression spring with the coil axis thereof curved on the y-z plane, with a lower end plane and an upper end plane tilted to a lower seat and an upper seat on the x-z plane and a coil axis of the spring curved on the x-z plane.

Referring to FIGS. 5–7, the relationship between the y-z plane in FIG. 1 (the plane including the end coil center line OF and the coil axis CA, and extending widthwise of the vehicle) and the x-z plane in FIG. 2 perpendicular to the y-z plane in FIG. 1 will be explained hereinafter.

FIG. 5 shows a variation of the reaction force axis when the predetermined angles δ and γ are varied, in the case where the helical spring 5 constituted as shown in FIG. 1 (projected on the y-z plane) is formed to provide a total number of coils of 4.8 coils (turns) for example, and projected on the x-z plane, and where the pitch of the lower end coil 5a is set so that the lower end plane LS is tilted to the lower seat 4 by the predetermined angle γ, and the pitch of the upper end coil 5b is set so that the upper end plane US is tilted to the upper seat 3 by the predetermined angle δ.

In other words, the helical spring 5 having 4.8 coils as shown in FIG. 5 is formed to provide the coil axis CA curved on the y-z plane by the curved amount "d" as shown in FIG. 1. At the same time, as shown in FIG. 1, the pitch of the lower end coil 5a is set to tilt the lower end plane LS at the first predetermined angle α to the lower seat 4 in the direction for shortening the longitudinal length of the helical spring 5 at the inside of the curvature in the unloaded state of the helical spring 5. Also, as shown in FIG. 1, the pitch of the upper end coil 5b is set to tilt the upper end plane US to the upper seat 3 at the second predetermined angle β in the direction for shortening the longitudinal length of the helical spring 5 at the outside of the curvature in the unloaded state of the helical spring 5. As shown in FIG. 5, the helical spring 5 with 4.8 coils set as described above is projected on the x-z plane (extending lengthwise of the vehicle), which is perpendicular to the y-z plane (extending widthwise of the vehicle), and the pitch of the lower end coil 5a is set so that the lower end plane LS is tilted to the lower seat 4 by the predetermined angle γ, and also the pitch of the upper end coil 5b is set so that the upper end plane US is tilted to the upper seat 3 by the predetermined angle δ. The variation of the reaction force axis is indicated by solid line arrows, broken line arrows and one-dot chain line arrows as shown in FIG. 5.

With respect to the helical spring 5 having 4.8 coils as constituted in FIG. 1 (projected on the y-z plane), if the lower end plane LS is tilted to the lower seat 4 by the predetermined angle γ and the upper end plane US is tilted to the upper seat 3 by the predetermined angle δ, on the x-z plane as shown in FIG. 5, the reaction force axis will be shifted according to the order of the one-dot chain line arrows, broken line arrows and solid line arrows, with the predetermined angles γ and δ increased, respectively, and the side force on the reaction force axis indicated by the solid line arrows will be almost zero.

In this case, however, the reaction force axis is slightly offset (or displaced) to the end coil center line (z-axis in FIG. 5), which may be negligible. In order to have the reaction force axis with the slightly offset amount coincide with the end coil center line, a coil axis CB of the helical spring 5 may be curved, on the x-z plane as shown in FIG. 6, by a predetermined amount "e". Furthermore, if the lower end plane LS and upper end plane US are tilted to the lower seat 4 and upper seat 3, respectively, and the coil axis CA is curved on the x-z plane as shown in FIGS. 5 and 6, the variation will be negligible, as is apparent from FIG. 7, which shows the variation of the reaction force axis on the y-z plane (extending widthwise of the vehicle) as shown in FIG. 1.

As described above, the structure projected on the x-z plane (extending lengthwise of the vehicle) is shown in FIG. 2. It is preferable that the side force is set to be zero on the x-z plane (extending lengthwise of the vehicle as shown in FIG. 2). In contrast, the predetermined side force is produced on the y-z plane (widthwise of the vehicle), and that the reaction force axis lies on the centers of the coil end planes, as shown in FIG. 1. On the x-z plane, therefore, the pitch of the lower end coil 5a is set so that the lower end plane LS is tilted to the lower seat 4 by the predetermined angle γ, and the pitch of the upper end coil 5b is set so that the upper end plane US is tilted to the upper seat 3 by the predetermined angle δ, in the direction for reducing the side force which may be exerted either rightward or leftward of the vehicle in FIG. 2, depending upon the mounted state of the spring or the like. Furthermore, according to the present embodiment, in the unloaded state of the helical spring 5, the coil axis CA is curved in the predetermined direction, by the amount "e" on the x-z plane.

As described above, according to the embodiment as shown in FIG. 2, the pitch of the lower end coil 5a is set to tilt the lower end plane LS at the third predetermined angle γ to the lower seat 4, and the pitch of the upper end coil 5b is set to tilt the upper end plane US at the fourth predetermined angle δ to the upper seat 3. However, it may be so arranged that only either one of the pitch of the lower end coil 5a and that of the upper end coil 5b is adjusted. Furthermore, the coil axis CB is curved in the predetermined direction by the amount "e" in the unloaded state of the helical spring 5, according to the embodiment as shown in FIG. 2. However, this amount may be omitted.

It should be apparent to one skilled in the art that the above-described embodiment is merely illustrative of but one of the many possible specific embodiments of the present invention. Numerous and various other arrangements can be readily devised by those skilled in the art without departing from the spirit and scope of the invention as defined in the following claims.

What is claimed is:

1. A helical compression spring for a vehicle suspension to be compressed between an upper seat and a lower seat, said spring being formed to provide a coil axis to be substantially curved at a predetermined radius of curvature in an unloaded state of said spring, wherein a pitch of a lower end coil of said spring is set to tilt a lower end plane of said spring seated on said lower seat at a first predetermined angle to said lower seat in a direction for shortening the longitudinal length of said spring at the inside of the curvature in the unloaded state of said spring, and/or a pitch of an upper end coil of said spring is set to tilt an upper end plane of said spring seated on said upper seat at a second predetermined angle in a direction for shortening the longitudinal length of said spring at the outside of the curvature in the unloaded state of said spring, and wherein the pitch of said lower end coil is set to tilt the lower end plane of said spring at a third predetermined angle to said lower seat on a plane including an end coil center line connecting the centers of said upper end coil and said lower end coil perpendicular to a plane including said end coil center line and said curved coil axis, in the unloaded state of said spring, and/or the pitch of said upper end coil is set to tilt the upper end plane of said spring at a fourth predetermined angle to said upper seat on the plane including said end coil center line perpendicular to the plane including said end coil center line and said curved coil axis, in the unloaded state of said spring.

2. The helical compression spring of claim 1, wherein said spring is formed to provide a coil axis on the plane including said end coil center line perpendicular to the plane including said end coil center line and said curved coil axis, to be curved in a predetermined direction in the unloaded state of said spring.

3. A strut type vehicle suspension comprising a strut mounted at the upper end thereof on a vehicle body for supporting a wheel, a lower seat fixed to said strut, an upper seat mounted on said vehicle body, and a helical compression spring mounted between said lower seat and said upper seat, with said strut enclosed in said spring, wherein said spring is formed to provide a coil axis to be substantially curved at a predetermined radius of curvature in an unloaded state of said spring, wherein said lower seat is fixed to said strut to tilt said lower seat at a first predetermined angle in a direction for shortening the longitudinal length of said spring at the outside of the curvature in the unloaded state of said spring, and/or said upper seat is mounted on said vehicle body to tilt said upper seat at a second predetermined angle in a direction for shortening the longitudinal length of said spring at the inside of the curvature in the unloaded state of said spring, wherein said lower seat is fixed to said strut to tilt said lower seat at a third predetermined angle on a plane including an end coil center line connecting the centers of an upper end coil and a lower end coil of said spring perpendicular to a plane including said end coil center line and said curved coil axis, and/or said upper seat is mounted on said vehicle body to tilt said upper seat at a fourth predetermined angle on the plane including said end coil center line perpendicular to the plane including said end coil center line and said curved coil axis, and wherein said spring is held in such a state that the inside of the curvature of said curved coil axis is positioned at the inside of said vehicle body.

4. The strut type vehicle suspension of claim 3, wherein said spring is formed to provide a coil axis on the plane including said end coil center line perpendicular to the plane including said end coil center line and said curved coil axis, to be curved in a predetermined direction in the unloaded state of said spring.

* * * * *